(12) United States Patent
Islinger et al.

(10) Patent No.: US 11,567,892 B2
(45) Date of Patent: Jan. 31, 2023

(54) BUS TRANSCEIVER

(71) Applicant: Infineon Technologies AG, Neubiberg (DE)

(72) Inventors: Tobias Islinger, Munich (DE); Magnus-Maria Hell, Munich (DE); Maximilian Mangst, Rott am Inn (DE); Eric Pihet, Munich (DE); Jens Repp, Markt Schwaben (DE)

(73) Assignee: Infineon Technologies AG, Neubiberg (DE)

( * ) Notice: Subject to any disclaimer, the term of this patent is extended or adjusted under 35 U.S.C. 154(b) by 9 days.

(21) Appl. No.: 17/230,526

(22) Filed: Apr. 14, 2021

(65) Prior Publication Data
US 2021/0334232 A1    Oct. 28, 2021

(30) Foreign Application Priority Data
Apr. 22, 2020 (DE) .......................... 102020110984.9

(51) Int. Cl.
| | |
|---|---|
| G06F 13/42 | (2006.01) |
| G06F 13/38 | (2006.01) |
| G06F 1/3234 | (2019.01) |
| G06F 13/40 | (2006.01) |
| G06F 13/30 | (2006.01) |

(52) U.S. Cl.
CPC ........ *G06F 13/4221* (2013.01); *G06F 1/3253* (2013.01); *G06F 13/30* (2013.01); *G06F 13/382* (2013.01); *G06F 13/409* (2013.01)

(58) Field of Classification Search
CPC .... G06F 13/4221; G06F 1/3253; G06F 13/30; G06F 13/382; G06F 13/409; G09G 2330/021

USPC .......................................................... 710/313
See application file for complete search history.

(56) References Cited

U.S. PATENT DOCUMENTS

| | | | | |
|---|---|---|---|---|
| 3,914,628 A | * | 10/1975 | Pao ........................ | H03K 5/151 326/89 |
| 4,982,392 A | * | 1/1991 | Soejima ................ | G11B 7/0945 |
| 5,153,466 A | * | 10/1992 | Stein .................... | H04L 25/0286 326/89 |
| 5,294,928 A | * | 3/1994 | Cooper ................. | H03M 1/002 341/142 |
| 5,325,395 A | * | 6/1994 | Tran ........................ | H04B 1/38 375/258 |
| 5,581,556 A | * | 12/1996 | Ohie ....................... | H04L 12/12 375/220 |
| 5,717,557 A | * | 2/1998 | Gonzalez ........... | H03K 19/0016 327/377 |

(Continued)

*Primary Examiner* — Paul R. Myers
(74) *Attorney, Agent, or Firm* — Slater Matsil, LLP

(57) ABSTRACT

In accordance with an embodiment, an integrated driver circuit includes: a first connection and a second connection configured to be connected to a control chip; at least one bus connection configured to be connected to a bus line; and a control circuit. The control circuit is configured to operate in a first mode or a second mode; to output a reception signal at the second connection in the second mode, where the reception signal represents a bus signal received at the bus connection; to assume a state of low power consumption in the first mode; to change from the first mode to the second mode when a first command is detected at the first connection or at the second connection; and to change from the second mode to the first mode when the bus signal does not indicate any data for a predefined period of time.

19 Claims, 4 Drawing Sheets

(56) References Cited

U.S. PATENT DOCUMENTS

| | | | | |
|---|---|---|---|---|
| 5,768,613 A * | 6/1998 | Asghar | G11B 7/08529 | 712/E9.067 |
| 5,790,876 A * | 8/1998 | Shima | G06F 1/32 | 713/320 |
| 5,832,244 A * | 11/1998 | Jolley | G06F 13/385 | 710/16 |
| 6,144,251 A * | 11/2000 | Ogawa | G06F 1/3253 | 327/544 |
| 6,282,407 B1 * | 8/2001 | Vega | G06K 19/0701 | 455/73 |
| 6,313,678 B1 * | 11/2001 | Hinterscher | H03K 5/12 | 327/170 |
| 6,674,762 B2 * | 1/2004 | Mores | H04L 12/40039 | 370/451 |
| 6,856,178 B1 * | 2/2005 | Narayan | H03K 19/018585 | 327/108 |
| 8,451,091 B2 * | 5/2013 | Hioki | F02D 41/2474 | 340/533 |
| 8,549,057 B1 * | 10/2013 | Hsieh | G06F 15/7871 | 708/319 |
| 10,320,589 B1 * | 6/2019 | Sankaran | H04B 1/525 | |
| 2001/0050580 A1 * | 12/2001 | O'Toole | G06K 7/10059 | 327/158 |
| 2003/0107475 A1 * | 6/2003 | Bautista | H04W 52/0229 | 340/7.35 |
| 2005/0030808 A1 * | 2/2005 | Brown | H04L 12/40097 | 365/222 |
| 2005/0265344 A1 * | 12/2005 | Harris | B60H 1/0073 | 370/392 |
| 2006/0220610 A1 * | 10/2006 | Solberg | B60L 8/003 | 320/105 |
| 2007/0110193 A1 * | 5/2007 | Solum | H04B 1/1027 | 375/345 |
| 2007/0298752 A1 * | 12/2007 | Nakada | H04L 25/026 | 455/343.1 |
| 2010/0208660 A1 * | 8/2010 | Ji | H04W 52/0225 | 370/328 |
| 2010/0316099 A1 * | 12/2010 | Sugita | G06F 1/3287 | 375/219 |
| 2012/0026926 A1 * | 2/2012 | Frenzel | H04M 11/062 | 370/311 |
| 2015/0086815 A1 * | 3/2015 | Wilhelm | H01M 10/425 | 429/61 |
| 2016/0113084 A1 * | 4/2016 | White | H05B 45/10 | 315/307 |
| 2016/0352237 A1 * | 12/2016 | Quigley | H02M 1/08 | |
| 2020/0326771 A1 * | 10/2020 | Wu | G06F 1/3287 | |
| 2021/0243049 A1 * | 8/2021 | Kuwata | H04L 12/40189 | |

* cited by examiner

BUS TRANSCEIVER

This application claims the benefit of German Patent Application No. 102020110984.9, filed on Apr. 22, 2020, which application is hereby incorporated herein by reference in its entirety.

TECHNICAL FIELD

The present description relates generally to a driver circuit (e.g., transceiver interface) for a serial bus, and, in particular embodiments, a driver circuit for a 2-wire Ethernet network node.

BACKGROUND

The current developments in the field of driving assistance systems (ADAS, Advanced Driver Assistant Systems) also require improvements in the so-called in-vehicle network systems (IVN, In-Vehicle Network). At present, the developments are focused on improving bus and network systems based on Ethernet, wherein a focus is on systems with high bandwidth and high data throughput. However, there are also applications—in particular, but not only, in the automotive sector—which manage with a lower bandwidth. In these cases, lower data rates, for example 10 Mbit/s, are sufficient and they are often low-cost applications which require simple, robust and favorable driver circuits, as are known, for example, from CAN technology (CAN, Controller Area Network).

Ethernet with a transmission rate of 10 Mbit/s is described in the IEEE 802.3cg standard which specifies the 10BASE-T1S network technology (is also referred to as 10SPE, 10 Mbit/s Single Pair Ethernet). This standard was taken up by the Open Alliance Special Interest Group in order to further develop Ethernet-based communication networks, in particular for automotive applications. The Open Alliance Tech Committee TC14 coordinates efforts to define the requirements with respect to interoperability, compliance and EMC (Electromagnetic Compatibility) and to develop test methods for 10BASE-T1S PHYs. In this case, PHY denotes layer 1 (Physical Layer) according to the standardized OSI model. In the course of this, an interface between the digital part and the analog part of 10BASE-T1S was also specified.

An object on which the invention described here is based can be considered that of making a contribution to the development described above and improving existing concepts.

SUMMARY

An integrated driver circuit for controlling a two-wire line in a network node is described below. According to one exemplary embodiment, the driver circuit has a first connection and a second connection which can both be connected to a controller chip. The driver circuit also has at least one bus connection which can be connected to a bus line. A control circuit of the driver circuit is designed to operate in a first mode or a second mode, and the control circuit is designed to output a reception signal, which represents a bus signal received at the bus connection, at the second connection in the second mode, and to assume a state of low power consumption in the first mode. The control circuit is also designed to change from the first mode to the second mode if a first command is detected at the first connection or the second connection, and to change from the second mode to the first mode if the bus signal does not indicate any data for a predefined period.

A method for controlling a two-wire line in a network node using a driver circuit is also described. According to one exemplary embodiment, the method comprises receiving a first command at a first connection of the driver circuit or at a second connection of the driver circuit. The method also comprises changing from a first mode to a second mode if the first command is received, wherein the driver circuit assumes a state of low power consumption in the first mode. In the second mode, the method comprises receiving a bus signal at a bus connection of the driver circuit and outputting a reception signal at the second connection of the driver circuit, wherein the reception signal represents data contained in the received bus signal. The method also comprises changing from the second mode to the first mode if the bus signal does not indicate any data for a predefined period.

BRIEF DESCRIPTION OF THE DRAWINGS

The exemplary embodiments are explained in more detail below on the basis of figures. The illustrations are not necessarily true to scale and the exemplary embodiments are not only restricted to the aspects illustrated. Rather, importance is placed on illustrating the principles on which the exemplary embodiments are based.

DETAILED DESCRIPTION OF ILLUSTRATIVE EMBODIMENTS

Figure 1:
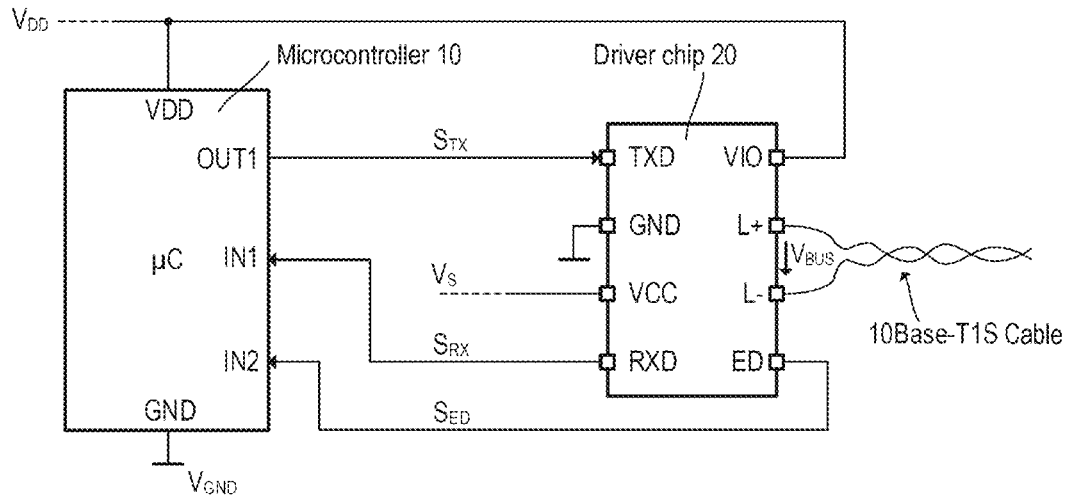
FIG. 1 illustrates an example of an integrated driver circuit having eight pins which is used as an interface between a microcontroller and a 10BASE-T1S two-wire line (Twisted Pair)

FIG. 1 illustrates a circuit having a microcontroller 10 and an integrated driver circuit 20 (driver IC) that constitutes an interface between the microcontroller 10 and a two-wire bus line in a network node. The examples described here relate to systems based on Ethernet (in particular 10BASE-T1S). However, the concepts described here can possibly also be applied to other network technologies. The driver IC 20 may have a standard chip package with eight pins (chip contacts) which are denoted by TXD, RXD, ED, L+, L−, VCC, GND and VIO in FIG. 1.

According to the definition of the Open Alliance TC14, five pins are needed for communication, specifically the pins L+ and L− for connecting the two-wire line (bus line) and the pins TXD, RXD and ED which are used for communication between the microcontroller 10 and the driver IC 20. The driver IC 20 receives serial data $S_{TX}$ (bit stream) from the microcontroller 10 at the pin TXD, and the driver IC 20 outputs serial data $S_{Rx}$ (bit stream) to the microcontroller 10 at the pin RXD, and the pin ED shows the microcontroller 10 whether or not active communication is taking place on the bus. Furthermore, two pins are needed to supply the driver IC 20, specifically the supply pin VCC for receiving the supply voltage $V_S$ and the ground pin GND.

The eighth pin VIO is not absolutely necessary for communication, but can be used in practice, since the supply voltage of the microcontroller 10 is not always the same and microcontrollers with different operating voltages $V_{DD}$ (for example 3.3 V, 5 V, etc.) can be used depending on the application. The operating voltage $V_{DD}$ of the microcontroller also defines the level of the signals at the pins RXD, TXD and ED, which is why the driver IC 20 must know the operating voltage $V_{DD}$ of the microcontroller. For this purpose, the driver IC 20 receives the operating voltage $V_{DD}$ of the microcontroller at the pin VIO.

Figure 2:
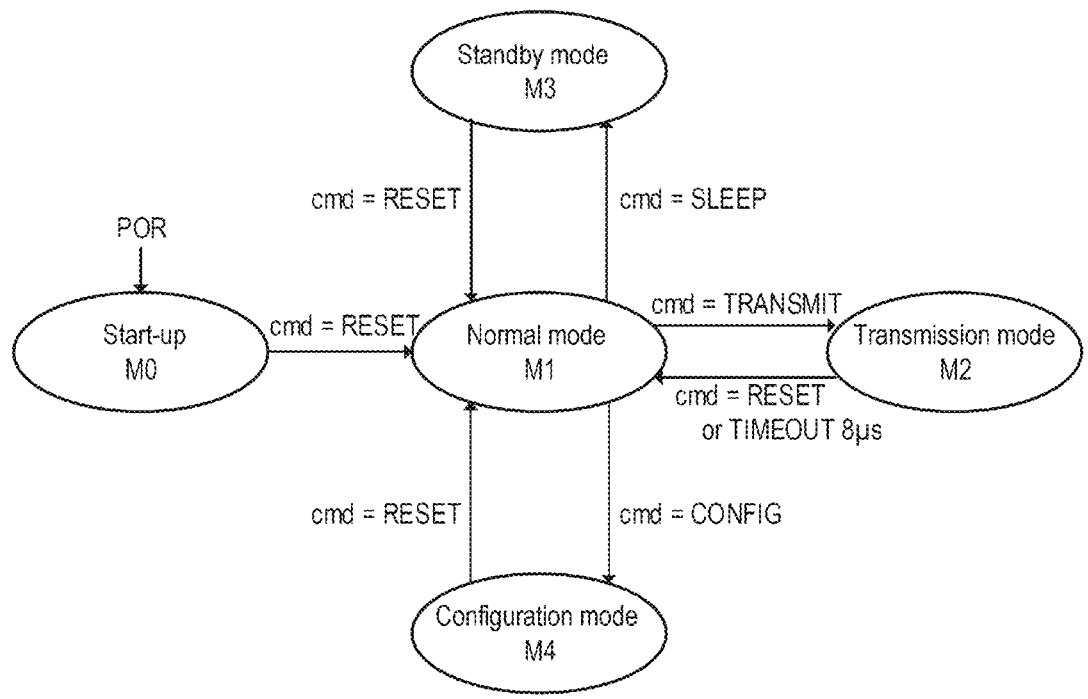
FIG. 2 illustrates four different modes of a driver circuit (Transceiver Interface) according to the definition of the Open Alliance TC14.

The driver IC 20 can operate in different modes. The modes currently defined by the Open Alliance TC14 are illustrated as an example in FIG. 2. According to FIG. 2, the possible modes comprise a start-up mode M0 (Boot Mode), a normal mode M1 (Normal Mode), a transmission mode M2 (Transmit Mode), a standby mode M3 (Standby Mode) and a configuration mode M4 (Config Mode). Mode changes from one mode to another are triggered by specific commands which are denoted by RESET, TRANSMIT, SLEEP and CONFIG in the example from FIG. 2.

The RESET command is accepted in every mode and always triggers a change to the normal mode M1. The TRANSMIT command is accepted only in the normal mode M1 and triggers a change to the transmission mode M2. The SLEEP command triggers a change to the standby mode M3, and the CONFIG command triggers a change to the configuration mode M4. A change from the transmission mode M2 back to the normal mode M1 can be triggered either via the RESET command or by expiry of a timer (Jabber Timer). The jabber timer is started with the change to the transmission mode M2 and is reset with each falling edge at the TXD pin. As soon as no more bits are transmitted, the jabber timer can count up to a maximum value (for example 8 µs). As soon as this maximum value has been reached, a flag (jabber_timer_done) is set, which then triggers the change back to the normal mode M1.

Data can be output to the bus line (that is to say at the pins L+ and L−) only in the transmission mode M2. The normal mode M1 is therefore also referred to as a read-only mode. A change to the start-up mode M0 is made only via a power-on-reset (POR). The CONFIG command and the SLEEP command are accepted only in the normal mode M1. The different modes can be implemented, for example, by using a finite state machine. It shall be emphasized at this point that the modes illustrated in FIG. 2 should be understood merely as examples. Existing concepts and standards are being continuously developed further, and the modes shown in FIG. 2 and their designation are consequently also subject to a certain change. In future systems, one or more modes may be omitted and new modes may be added.

On account of the limited number of pins of the driver IC 20, the commands mentioned are coded in the (binary) data signal $S_{TX}$ which is received by the driver IC 20 from the microcontroller 10 at the pin TXD. Examples of the RESET, TRANSMIT and SLEEP commands are illustrated in diagrams (a) to (c) in FIG. 3. The diagrams in FIG. 3 each show the data signal $S_{TX}$ received at the pin TXD and the associated command, in which case NONE stands for "no command".

Figure 3:
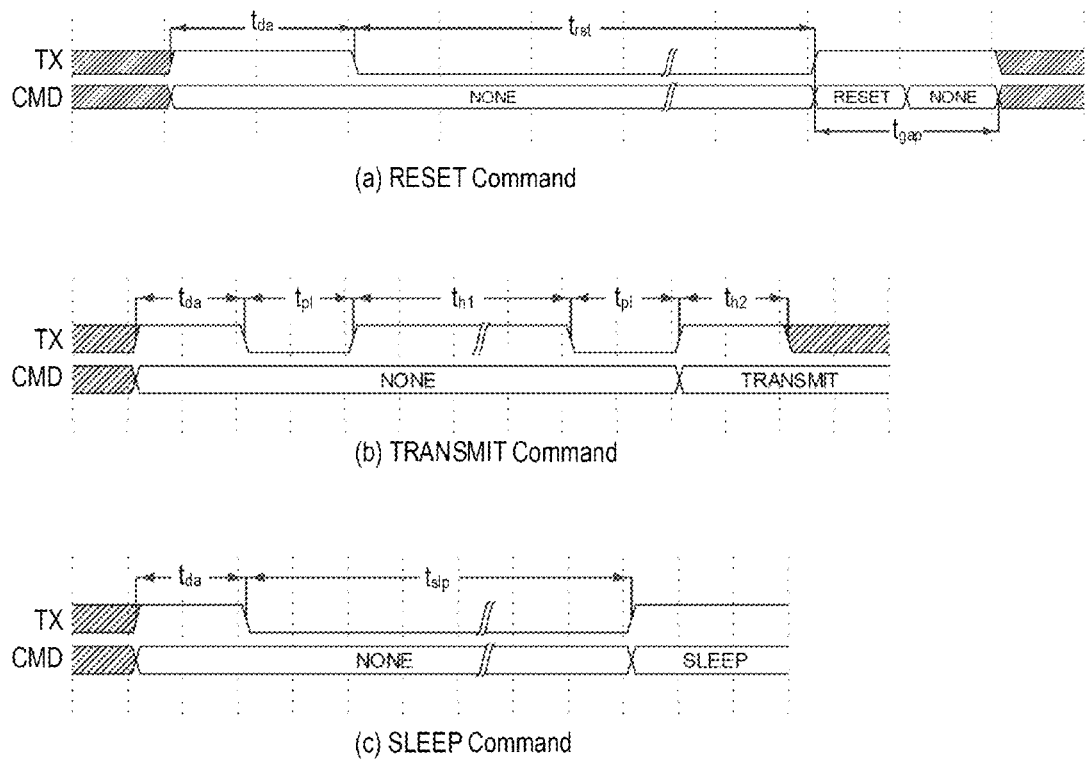
FIG. 3 uses timing diagrams to illustrate, by way of example, the coding of commands for triggering mode changes.

According to FIG. 3, diagram (a), the microcontroller 10 signals the RESET command to the driver IC 20 using a high level of the duration $t_{da}$ and an immediately following low level of the duration $t_{rst}$, which is again followed by a high level for at least a period $t_{gap}$. For example, the period $t_{da}$ may be approximately 20 µs and the period $t_{rst}$ may be approximately 80 µs. The period $t_{gap}$ may likewise be 20 µs. The RESET command is active at the end of the period $t_{rst}$.

According to FIG. 3, diagram (b), the microcontroller 10 signals the TRANSMIT command to the driver IC 20 using a high level of the duration $t_{da}$ and two subsequent low pulses each with a pulse duration of to, wherein a high level is generated for a period $t_{h1}$ between the two low pulses and the second low pulse is again followed by a high level for at least a period $t_{h2}$. For example, the pulse duration to of the low pulses may be approximately 20 µs. The pause (period $t_{h1}$) between the low pulses may be approximately 180 µs, and the period $t_{h2}$ may likewise be 20 µs. The TRANSMIT command is active at the end of the second low pulse. In the transmission mode M2, the driver IC 20 receives a DME (DME=Differential Manchester Encoding) bit stream at the pin TXD.

According to FIG. 3, diagram (c), the microcontroller 10 signals the SLEEP command to the driver IC 20 using a high level of the duration $t_{da}$ and an immediately following low level of the duration $t_{slp}$ of at least 16 µs, for example, which is again followed by a high level. The SLEEP command is active at the end of the period $t_{slp}$. It is not possible to confuse the SLEEP and RESET commands since the SLEEP command is accepted only in the normal mode M1 in which the RESET command does not make any sense and is therefore not required.

Figure 4:
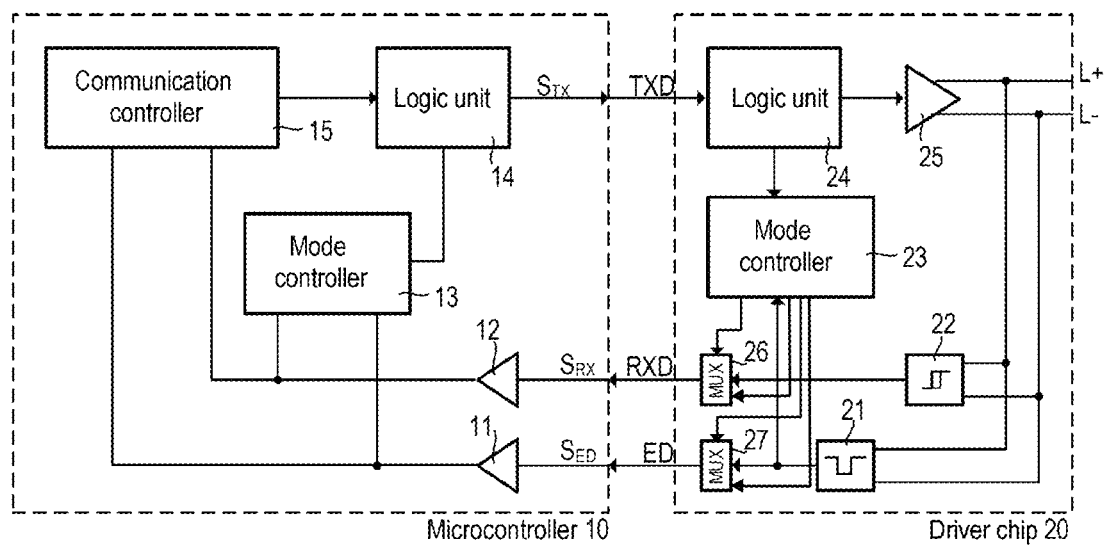
FIG. 4 uses a block diagram to illustrate an example of a structure of the driver circuit from FIG. 1.

FIG. 4 uses a block diagram to illustrate an example of a possible structure of the driver IC 20. The driver IC 20, in particular the logic unit 24 and the mode controller 23, is largely implemented by hard-wired digital circuits. Alternatively, the driver IC 20 may also comprise a processor which is designed to execute software instructions in order to provide the desired functions. In this case, the logic unit 24 and the mode controller 23 may also be function blocks of software. A combination of hard-wired logic circuits and a programmable processor is also possible. The blocks 13, 14 and 15 (logic unit, mode controller and communication controller) of the microcontroller are generally function blocks of software/firmware which is executed by a processor of the microcontroller. The function of the components of the driver IC 20 is first of all described in more detail.

The logic circuit 24 receives the data signal $S_{TX}$ at the pin TXD and, on the basis of the data signal Six, generates a control signal for the driver circuit 25 with a differential output, that is to say the two outputs of the driver circuit 25 are connected to the pins L+ and L−. Depending on the control signal supplied to the driver circuit 25, the bus voltage $V_{BUS}$ between the pins L+ and L− may be positive, negative or approximately zero. A bus voltage $V_{BUS}$ above a threshold value of 30 mV, for example, can be interpreted as a high level. Equally, a bus voltage $V_{BUS}$ below a threshold value of −30 mV, for example, can be interpreted as a low level. However, the peak-to-peak voltage between the pins L+ and L− may be considerably higher, for example in the range of 0.8 V-2 V (depending on the termination of the line). The logic circuit 24 is also designed to decode the commands described above and to forward a received command to the mode controller 23.

The threshold values mentioned (±30 mV) can be used by the (window) comparator 22 to convert the bus voltage $V_{BUS}$ into a corresponding binary data signal $S_{RX}$ which can then be output (via the multiplexer 26) at the pin RXD. However, the specific value of the comparator thresholds depends on the respective implementation. The comparator 21 generates (via the multiplexer 27) an output signal $S_{ED}$, which signals activity on the bus, at the pin ED. That is to say, the signal $S_{ED}$ uses a high level to indicate that a positive or negative bus voltage is actively being applied to the bus (between the pins L+ and L−). If the bus voltage $V_{BUS}$ is close to zero, the bus output of the driver IC 20 is in a high-impedance (high Z) state. The threshold values for the comparator can be approximately 300 mV and −300 mV, for example. That is to say, the output signal $S_{ED}$ from the comparator 21 uses a high level to indicate bus activity when the bus voltage $V_{BUS}$ is greater than 300 mV or less than −300 mV. The threshold values may also depend on the actual bus voltage (peak-to-peak value).

The mode controller 23 "sees" the received commands (cf. FIG. 3), the above-mentioned jabber timer and also the signal $S_{ED}$ output at the pin ED and can prompt a change of the mode on the basis thereof. In some exemplary embodiments, a mode change results in the driver IC 20 outputting a particular signal or a particular signal level at the pins RXD and/or ED. For example, it may be desirable to output a high level at the pin ED in the standby mode M3 irrespective of bus communication (also see FIG. 5, level change at the pin ED at the time $t_5$). Additionally or alternatively, it may be desirable to output a confirmation signal at the pin RXD after a mode change, which confirmation signal indicates that the mode change has been carried out. For example, a (confirmation) signal which comprises a defined bit pattern or has a defined level (also see FIG. 7) may be output at the RXD pin in the standby mode irrespective of bus communication. For this purpose, the driver IC 20 contains the multiplexers 26 and 27 mentioned which connect either the mode controller 23 or the outputs of the comparators 22 and 21 to the pins RXD and ED. The multiplexers 26 and 27 make it possible for the mode controller 23 to output signals at the pins RXD and ED even if there is no bus communication, that is to say the voltage $V_{BUS}$ on the bus (that is to say between the pins L+, L−) is approximately 0 volts.

On the side of the microcontroller 10, the mode controller 13 is designed, in the event of an upcoming mode change, to output the corresponding command to the logic unit 14 which outputs the command by encoding the signal $S_{TX}$, as illustrated in FIG. 3, for example. In the transmission mode, the communication controller 15 generates a data stream (for example a data frame (for example Ethernet frame) according to a communication protocol). This data stream is encoded by the logic unit 14, using differential Manchester encoding (DME) in the present examples. The resulting DME bit stream is output at an output pin of the microcontroller 10 and is supplied to the pin TXD of the driver IC 20. The buffers 11 and 12 receive the signals $S_{RX}$ and $S_{ED}$ and convert them into corresponding logic levels. The communication controller 15 sees the logic states of the signals $S_{RX}$ and $S_{ED}$ at the outputs of the buffers 11 and 12.

In the transmission mode M2, the bit stream received at the pin TXD is output on the bus (bus voltage $V_{Bus}$ between pins L+ and L−). In addition (also in other modes), the pin TXD can be used to transmit commands to the driver IC 20. The RXD pin is required only in the normal mode M1 if a signal is received at the pins L+, L−. If this is not the case, the RXD pin can be used to transmit other, additional information to the microcontroller 10. Depending on the implementation, the receiver (comparator 22) may also be active in the transmission mode M2, with the result that the signal transmitted to the bus is also simultaneously received again (loopback).

Figure 5:
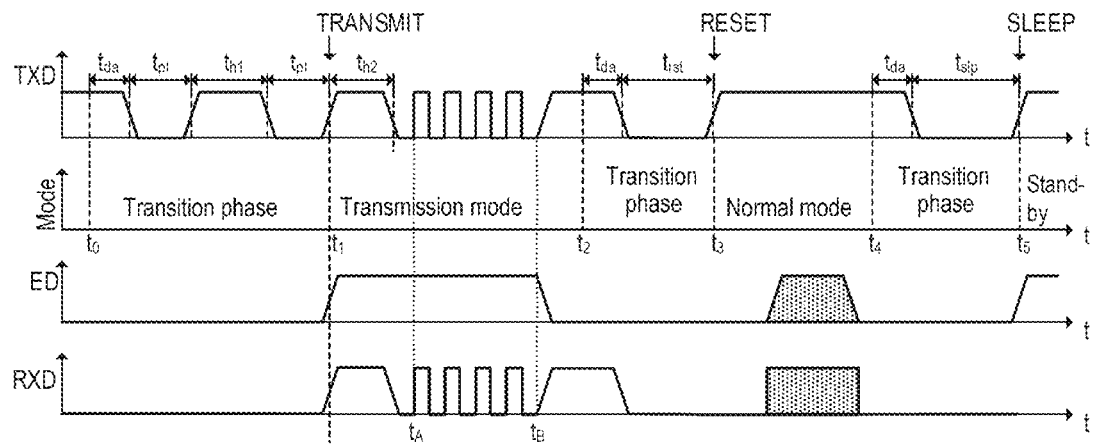
FIGS. 5 and 6 use timing diagrams to illustrate the operation of the driver circuit from FIG. 1 with a plurality of mode changes.
Figure 6:
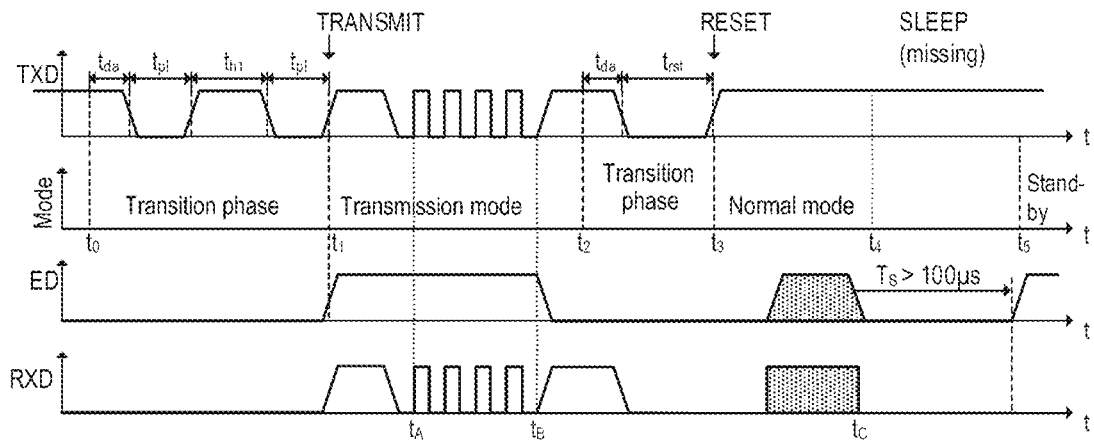

FIGS. 5 and 6 use timing diagrams to illustrate the operation of the driver IC 20 from FIG. 1 with a plurality of mode changes (starting from the normal mode M1). In the example from FIG. 5, the microcontroller 10 transmits a TRANSMIT command (cf. FIG. 3, diagram (b)) at the time $t_0$. The TRANSMIT command becomes active (effective) at the time $t_1$, and the period between $t_0$ (microcontroller initiates command) and $t_1$ (command effective in the driver IC) is referred to as a transition phase. After the time $t_1$, the driver IC 20 operates in the transmission mode M2 and is able to receive data at the TXD pin and to output a corresponding bus voltage $V_{BUS}$ on the bus (pins L+ and L−). Active communication on the bus is indicated using a high level at the pin ED (signal $S_{ED}$) and the pin RXD (signal $S_{ED}$) indicates the logic state on the bus. For example, $S_{RX}$=High corresponds to $V_{BUS}$>300 mV and $S_{RX}$=Low corresponds to $V_{BUS}$<−300 mV. It goes without saying that the numerical values are only examples. Data transmission (for example a frame) begins after the time $t_A$ and ends at the time $t_B$. It goes without saying that the level changes illustrated in FIG. 5 between the times $t_A$ and $t_B$ symbolize any desired sequence of data bits.

After the time $t_2$, the microcontroller 10 initiates a further mode change by transmitting the RESET command (cf. FIG. 3, diagram (a)). The command becomes effective in the driver IC 20 at the time $t_3$ and the driver IC 20 changes back to the normal mode M1. The period between the times $t_2$ and $t_3$ is again referred to as a transition phase. In the example illustrated, the driver circuit 25 (see FIG. 4) becomes inactive at the end of the transition phase (time $t_3$) and, with a comparatively high output resistance (corresponding to the bus termination), outputs a bus voltage $V_{BUS}$ of approximately zero volts. In the case of $V_{BUS}$=0 V, the output of the comparator 22 remains in its current state until the bus voltage $V_{BUS}$ changes again. In the normal mode M1, the driver IC 20 is ready to receive data from the bus and to output a corresponding data stream (data signal $S_{RX}$) at the RXD pin (cf. FIG. 4). The received data are symbolized in FIG. 5 by the region shaded in gray. At the time $t_4$, the microcontroller 10 initiates a SLEEP command which becomes inactive in the driver IC 20 at the time $t_5$, whereupon the driver IC 20 changes to the standby mode M3 after the transition phase from $t_4$ to $t_5$. The signal $S_{ED}$ at the ED pin is specified as a high level in the standby mode M3.

Existing concepts and specifications depend on the microcontroller 10 always being available and communication between the microcontroller 10 and the driver IC 20 being possible at any time. However, if the microcontroller 10 is defective or switched off, is just restarting or does not function as desired on account of another problem, the driver IC 20 can no longer be controlled by the microcontroller 10. Such a situation is usually undesirable in terms of safety. This problem is solved by means of the behavior of the driver IC 20, illustrated in FIG. 6, by virtue of the driver IC 20 automatically changing to the standby mode M0—without receiving a SLEEP command—if no active communication on the bus is detected for a defined period (for example 100 μs).

Until the time $t_4$, the example from FIG. 6 is the same as the previous example from FIG. 5. However, the example from FIG. 6 is based on the assumption that the microcontroller 10 fails at some point after the time $t_3$ and is not available (for whatever reasons) to transmit commands to the driver IC 20. After the time $t_3$, the driver IC 20 is in the normal mode and is able to receive data from the bus. In the example from FIG. 6, bus communication is finished at the time $t_4$, which is indicated by a level change of the signal $S_{ED}$ output at the ED pin from high to low. As soon as the signal level output at the ED pin is low, a timer (for example contained in the mode controller 23) is used to determine the length of time (in the normal mode M1) for which no bus communication has taken place. After a defined period $T_S$ (for example 100 µs), the driver IC 20 then changes to the standby mode even though a SLEEP command has not been received. That is to say, the driver IC 20 changes from the normal mode M1 to the standby mode M3 automatically and without receiving a SLEEP command, either a period $T_S$ after activation of the normal mode M1 if no communication on the bus is detected (signal $S_{ED}$ remains at the low level) or a period after the end of communication on the bus (signal $S_{ED}$ changes from the high level to the low level).

Figure 7:
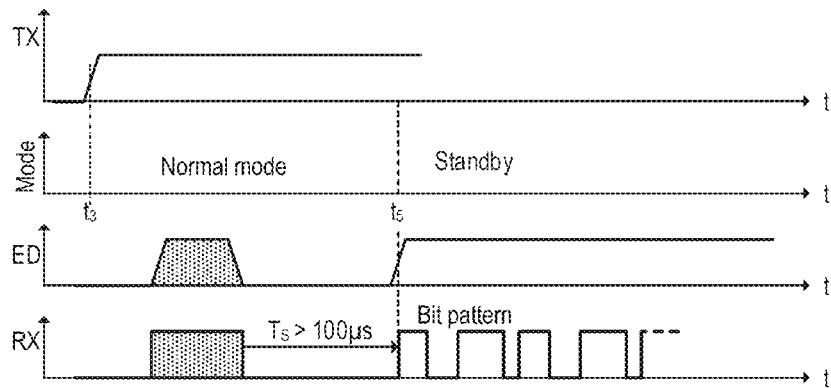
FIG. 7 illustrates an example of an expansion of the example from FIG. 6.

FIG. 7 illustrates an expansion of the example from FIG. 6. The timing diagram from FIG. 7 starts at the time $t_3$ and shows the same situation as FIG. 6 between the times $t_3$ and $t_5$. Automatic time-controlled changing to the standby mode M3 is carried out at the time $t_5$ a period $T_S$ after the end of bus communication. During the standby mode M3, the driver IC 20 outputs a particular bit pattern at the RXD pin (signal $S_{RX}$) in order to thus signal to the microcontroller 10 (as soon as it is available again after a reboot, for example) that an automatic change to the standby mode M3 has been carried out. The bit pattern can be output periodically, for example, at the pin RXD until a RESET command, and therefore a further mode change, is triggered. In exemplary embodiments in which the signal $S_{ED}$ at the ED pin is set to a high level according to the specification, if the driver IC 20 changes to the standby mode M3, the microcontroller 10 can detect, for example after a reboot, from the signal $S_{ED}$—in combination with the bit pattern mentioned—that the driver IC 20 has not lost its supply voltage and is in the standby mode even though the latter was not triggered using a SLEEP command.

In the examples described above, the driver IC 20 was designed to receive commands from the microcontroller 10 at the TXD pin, at which data to be transmitted to the bus are also received. It may also be desirable to transmit data and commands to the driver IC 20 in different ways. According to the example from FIG. 8, the RXD pin can be configured both as an output pin and as an input pin, wherein the driver IC 20 is designed to output, in the standby mode, a "weak 1" which can be overwritten by the microcontroller 10. In this context, "weak 1" means that the driver IC 20 is designed to output a high level at the RXD pin, wherein the voltage source which generates the high level has a relatively high internal resistance, with the result that the microcontroller 10 can pull the level at the RXD pin to a low level without any problems. This low level can be detected by the driver IC 20, with the result that the RXD pin can also be used as an input pin. During the normal mode and the transmission mode, the driver IC 20 generates "strong" signal levels (that is to say with a low internal resistance) at the RXD pin. In these situations, the RXD pin functions only as an output pin.

Figure 8:
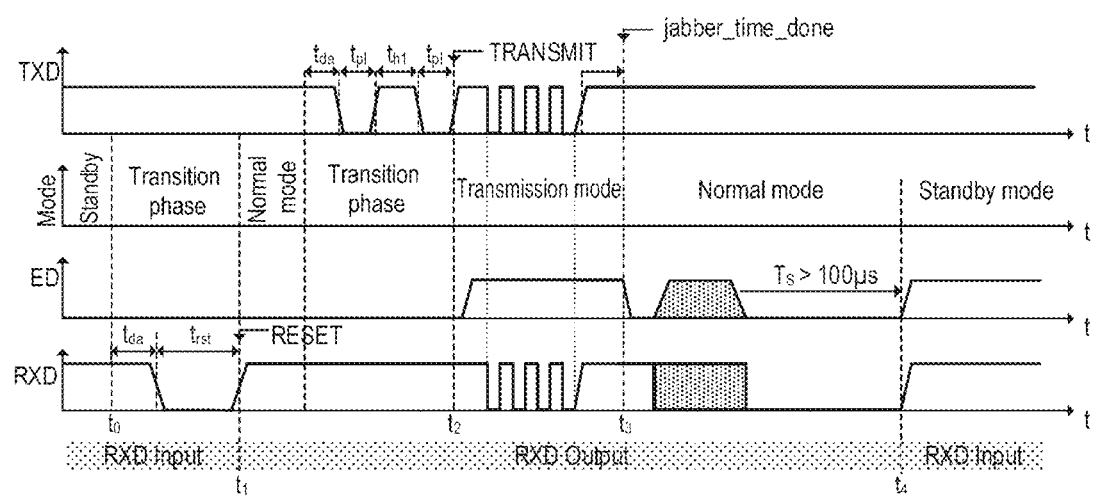
FIG. 8 uses timing diagrams to illustrate an example of an alternative to the example from FIG. 6.

The example from FIG. 8 begins with the standby mode in which the driver IC is initially situated. At the time $t_0$, the microcontroller 10 initiates a RESET command which—unlike in the example from FIG. 6—is transmitted to the RXD pin (instead of the TXD pin). The RESET command becomes active at the time $t_1$ and the driver IC 20 changes to the normal mode. Shortly afterward, the microcontroller begins to transmit data, for which purpose a TRANSMIT command is first of all transmitted to the TXD pin and becomes effective at the time $t_2$. That is to say, at the time $t_2$, the driver IC 20 changes to the transmission mode and the data generated at the TXD pin are output to the bus (pins L+ and L−) (that is to say the signal $S_{RX}$ represents the signal $S_{TX}$). In the present example, the transmission mode ends by virtue of expiry of the jabber timer mentioned further above (jabber_timer_done flag is set) at the time $t_3$.

After the time $t_3$, the driver IC 20 operates in the normal mode again and is ready to receive data. If—as in the previous example from FIG. 6—no activity on the bus (that is to say voltage $V_{BUS}$ between pins L+ and L− is approximately zero volts) is detected for a particular period $T_S$, the driver IC 20 changes to the standby mode without the need for an explicit SLEEP command. In the present example, the standby mode begins at the time $t_4$. With the beginning of the standby mode, a "weak 1" is again output at the RXD pin and the RXD pin again functions as an input pin.

What is claimed is:

1. An integrated driver circuit having:
   a first connection and a second connection configured to be connected to a control chip;
   at least one bus connection configured to be connected to a bus line;
   a transmitter having an output coupled to the at least one bus connection;
   a receiver having an input coupled to the at least one bus connection; and
   a control circuit coupled to the first connection, the second connection, the transmitter and the receiver, the control circuit configured to:
   operate in a first mode or a second mode,
   output a reception signal at the second connection in the second mode, wherein the reception signal represents a bus signal received at the bus connection by the receiver,
   assume a state of low power consumption in the first mode,
   change from the first mode to the second mode when a first command from the control chip is detected at the first connection or at the second connection,
   change from the second mode to the first mode when the bus signal received by the receiver does not indicate any data for a predefined period of time,
   operate in a third mode in which the transmitter is configured to transmit data received from the control chip at the first connection to the at least one bus connection, and
   change from the second mode to the third mode when a second command is detected at the first connection.

2. The driver circuit as claimed in claim 1, wherein the first command is represented by a binary signal having a particular sequence of level changes.

3. The driver circuit as claimed in claim 1, wherein the control circuit is further configured to output a confirmation signal at the second connection after a change has been made from the second mode to the first mode after expiry of the predefined period of time.

4. The driver circuit as claimed in claim 1, wherein:
   the second connection is configured as an input in the first mode, and
   the control circuit is configured to change from the first mode to the second mode when the first command is received at the second connection when the second connection is configured as an input.

5. The driver circuit as claimed in claim 4, wherein the second connection is configured as an output in the second mode.

6. The driver circuit as claimed in claim 1, wherein the bus signal received at the bus connection in the second mode corresponds to a 10BASE-T1S standard.

7. The driver circuit of claim 1, wherein the receiver comprises:
   a first comparator having an input coupled to the bus connection and an output coupled to the first connection; and
   a second comparator having an input coupled to the bus connection and an output coupled to the second connection.

8. The driver circuit of claim 7, wherein;
   the first comparator is configured to detect bus activity on the bus connection and provide a bus activity indication signal to the first connection; and
   the second comparator is configured to detect data received at the bus connection and provide the detected data to the second connection.

9. The driver circuit of claim 8, wherein the second comparator comprises a window comparator.

10. The driver circuit of claim 7, further comprising:
    a first multiplexer having a first input coupled to the output of the first comparator, a second input coupled to a mode controller, and an output coupled to the first connection; and
    a second multiplexer having a first input coupled to the output of the second comparator, a second input coupled to the mode controller, and an output coupled to the second connection.

11. The driver circuit of claim 10, wherein the mode controller is configured to provide data to the second connection during the second mode via the second multiplexer.

12. The driver circuit of claim 10, wherein the second comparator and the second multiplexer are configured to provide loopback data transmitted on the bus connection to the second connection during the second mode.

13. A network node comprising:
    a microcontroller; and
    an integrated driver circuit comprising
       a first connection connected to a first pin of the microcontroller,
       a second connection connected to a second pin of the microcontroller,
       at least one bus connection configured to be connected to a two-wire bus line,
       a transmitter having an output coupled to the at least one bus connection,
       a receiver having an input coupled to the at least one bus connection, and
       a control circuit coupled to the first connection, the second connection, the transmitter and the receiver, the control circuit configured to:
          operate in a first mode or a second mode,
          output a reception signal at the second connection in the second mode, wherein the reception signal represents a bus signal received at the bus connection by the receiver,
          assume a state of low power consumption in the first mode;
          change from the first mode to the second mode when a first command from the microcontroller is detected at the first connection or at the second connection,
          change from the second mode to the first mode when the bus signal received by the receiver does not indicate any data for a predefined period of time, wherein the microcontroller is configured to generate the first command and transmit the first command to the driver circuit,
          operate in a third mode in which the transmitter is configured to transmit data received from the microcontroller at the first connection to the at least one bus connection, and
          change from the second mode to the third mode when a second command is detected at the first connection.

14. A method for operating a driver circuit, the method comprising:
    receiving a first command at a first connection of the driver circuit or at a second connection of the driver circuit;
    changing from a first mode to a second mode when the first command is received, wherein the driver circuit assumes a state of low power consumption in the first mode;
    in the second mode, receiving a bus signal at a bus connection of the driver circuit and outputting a reception signal at the second connection of the driver circuit, wherein the reception signal represents data contained in the received bus signal;
    changing from the second mode to the first mode when the bus signal does not indicate any data for a predefined period;
    operating the driver circuit in a third mode comprising outputting a bus signal at the bus connection, wherein the bus signal represents a data signal received at the first connection; and
    changing the driver circuit from the second mode to the third mode when a second command is detected at the first connection.

15. The method as claimed in claim 14, further comprising outputting a confirmation signal at the second connection after a change has been made from the second mode to the first mode after expiry of the predefined period.

16. The method as claimed in claim 14, further comprising changing from the first mode to the second mode when the first command is received at the second connection when the second connection is configured as an input.

17. The method as claimed in claim 14, further comprising configuring the second connection as an output in the second mode.

18. The method as claimed in claim 14, wherein receiving the bus signal at the bus connection comprises receiving the bus signal according to a 10BASE-T1S standard.

19. An integrated driver circuit having:
    a first connection and a second connection configured to be connected to a control chip;
    at least one bus connection configured to be connected to a bus line;
    a control circuit configured to operate in a first mode or a second mode, the control circuit configured to:
       output a reception signal at the second connection in the second mode, wherein the reception signal represents a bus signal received at the bus connection,
       assume a state of low power consumption in the first mode,
       change from the first mode to the second mode when a first command is detected at the first connection or at the second connection, and
       change from the second mode to the first mode when the bus signal does not indicate any data for a predefined period of time;

a first comparator having an input coupled to the bus connection and an output coupled to the first connection;
a second comparator having an input coupled to the bus connection and an output coupled to the second connection;
a first multiplexer having a first input coupled to the output of the first comparator, a second input coupled to a mode controller, and an output coupled to the first connection; and
a second multiplexer having a first input coupled to the output of the second comparator, a second input coupled to the mode controller, and an output coupled to the second connection, wherein the mode controller is configured to provide data to the second connection during the second mode via the second multiplexer.

\* \* \* \* \*